United States Patent
Kim et al.

(10) Patent No.: US 9,096,779 B2
(45) Date of Patent: Aug. 4, 2015

(54) CONDUCTIVE TRANSPARENT ADHESIVE COMPOSITION AND ADHESIVE PREPARED BY USING THE SAME

(75) Inventors: Eun Kyoung Kim, Seoul (KR); Byeong Gwan Kim, Yongin-si (KR); Young Jung Kim, Seoul (KR); Jeong Hun Kim, Seoul (KR)

(73) Assignee: INDUSTRY-ACADEMIC COOPERATION FOUNDATION, YONSEI UNIVERSITY (KR)

(*) Notice: Subject to any disclaimer, the term of this patent is extended or adjusted under 35 U.S.C. 154(b) by 0 days.

(21) Appl. No.: 13/884,962

(22) PCT Filed: Nov. 10, 2011

(86) PCT No.: PCT/KR2011/008581
§ 371 (c)(1),
(2), (4) Date: May 11, 2013

(87) PCT Pub. No.: WO2012/064133
PCT Pub. Date: May 18, 2012

(65) Prior Publication Data
US 2013/0234076 A1 Sep. 12, 2013

(30) Foreign Application Priority Data
Nov. 12, 2010 (KR) .................. 10-2010-0112900

(51) Int. Cl.
| C09J 11/04 | (2006.01) |
| C09J 9/02 | (2006.01) |
| H01B 1/00 | (2006.01) |
| C09J 11/08 | (2006.01) |
| C09J 4/00 | (2006.01) |
| C09J 7/00 | (2006.01) |
| H01L 51/00 | (2006.01) |
| H01B 1/12 | (2006.01) |
| C08K 3/04 | (2006.01) |

(52) U.S. Cl.
CPC ..... *C09J 9/02* (2013.01); *C09J 4/00* (2013.01); *C09J 7/00* (2013.01); *C09J 11/04* (2013.01); *C09J 11/08* (2013.01); *H01B 1/00* (2013.01); *C08K 3/04* (2013.01); *C09J 2205/102* (2013.01); *C09J 2433/00* (2013.01); *H01B 1/12* (2013.01)

(58) Field of Classification Search
CPC ............ C08K 3/04; H01B 1/24; B82Y 30/00; H01L 51/0036; H01L 51/0067; H01L 51/0072; C09J 9/02; C09J 4/00; C09J 11/02; C09J 201/00
USPC .................................................. 252/500, 511
See application file for complete search history.

(56) References Cited

U.S. PATENT DOCUMENTS

| 2005/0062024 A1 | 3/2005 | Bessette et al. |
| 2006/0062958 A1* | 3/2006 | Yoshida et al. ............. 428/64.4 |

FOREIGN PATENT DOCUMENTS

| JP | 2007051173 A | 3/2007 |
| KR | 100814525 B1 | 3/2008 |
| KR | 20090087704 A | 8/2009 |

*Primary Examiner* — Mark Kopec
*Assistant Examiner* — Danny N Kang (57) ABSTRACT

An electroconductive transparent adhesive composition containing a transparent adhesive monomer, any one electroconductive mesoporous filler selected from the group consisting of porous carbon, an electroconductive polymer and combinations thereof, and a polymerization initiator, and an electroconductive transparent adhesive produced using the composition are provided. The electroconductive transparent adhesive composition is less expensive and highly economically efficient, and has excellent electrical conductivity and transparency, and has excellent mechanical strength. Thus, the electroconductive transparent adhesive composition can be used in a variety of electrical and electronic applications such as touch screens, displays, and electronic devices.

12 Claims, 2 Drawing Sheets

CONDUCTIVE TRANSPARENT ADHESIVE COMPOSITION AND ADHESIVE PREPARED BY USING THE SAME

BACKGROUND OF THE INVENTION (a) Field of the Invention

The present invention relates to an electroconductive transparent adhesive composition, and an electroconductive transparent adhesive produced using the composition. The electroconductive transparent adhesive can be used as an adhesive in various electrical and electronic applications such as displays, touch screens, touch lenses, electronic devices, and electrical electrodes, and can also be used as a medical tape, a wrapping tape, or a masking tape.

(b) Description of the Related Art

Adhesives are used in a wide variety of applications such as sheets, films, labels and tapes due to their easy usability, and the materials to be adhered also include a wide variety of materials such as organic materials, metallic materials and inorganic materials. Recently, the range of applications is gradually extending over displays, touch screens, touch panels, touch lenses, electronic devices, electrical electrodes, and LED lightings, where high functionality in various properties, and high durability and reliability against moisture, corrosion and temperature are required. Particularly, in regard to the application of adhesives, for the purpose of weight reduction and miniaturization in electronic industries, adhesives have been applied to the surface packaging on printed circuit boards, adhesion of liquid crystal display devices, and adhesion of magnetic materials to video/audio films, and the like.

Compounds are used in the adhesives as described above can be classified, on the basis of components, into rubber-based adhesives, silicone-based adhesives, acrylic adhesives, and the like. The rubber-based adhesives have poor heat resistance and weather resistance, exhibit severe fluctuation in fluidity along with temperature change, and also have a disadvantage that a large amount of residue remains on the material to be adhered; therefore, recently, an investigation on adhesives containing synthetic rubbers such as SBR (styrene-butadiene rubber), BR (butyl rubber), NBR (nitrile-butadiene rubber) and TPR (thermoplastic rubber) as main components is in active progress.

The silicone-based adhesives are adhesives that have been most recently developed, but they are disadvantageous in that the use of the adhesives is limited only to special applications, and the adhesives are expensive and, in particular, cannot be used for general purposes.

Regarding the rubber-based and silicone-based adhesives, research has already seen significant progress; however, active investigations on the acrylic adhesives are only now being conducted. The acrylic adhesives have excellent weather resistance and oil resistance that the rubber-based or silicone-based adhesives do not have, and adhesives suitable for the purpose can be relatively easily produced by inducing polar groups in an arbitrary polymer molecule in consideration of the polarity of the material to be adhered. Furthermore, the acrylic adhesives have the same characteristics as those of other general adhesive from the viewpoint that the molecular structure, terminal group or branching property of the polymer and the like affect the adhesive, and there is selectivity even in view of the form, such as a solvent type adhesive, an emulsion type adhesive, or a solvent-free type adhesive. Therefore, the acrylic adhesives have currently secured a position in the pertinent art.

On the other hand, transparent adhesives are used for interlaminar bonding by which components are stacked up when a liquid crystal display device (LCD) is produced, or for the attachment of a touch screen to a mobile telephone. The optical transparent adhesives described above belong to an organic adhesive-synthetic-resin-thermoplastic-acrylic system. Optical transparent adhesives that are currently commercially available have a light transmittance of 97% or higher so that the optical transparent adhesives increase resistance to humidity, temperature and corrosion as in the case of glass, and the flection of the surface is as small as about 1% and uniform as compared with existing double-sided tapes so that the optical transparent adhesives increase the clarity of screens while exhibiting good adhesiveness. Such functional adhesives employ polymer materials and are more flexible than conventional metallic materials or the like, and are thus applicable to the fields of adhesive films, sheets and tapes for flexible displays, touch screens, touch panels, touch lenses and the like.

Furthermore, regarding an electroconductive adhesive, for example, US Patent Application Publication No. 2009-0311502 A1 suggest a method for producing an electroconductive adhesive by mixing a non-tertiary alcohol having 4 to 14 carbon atoms and an acrylic acid ester having an alkyl group, with electroconductive flakes. Furthermore, U.S. Pat. No. 7,494,708 B1 reports a method for producing a pressure-sensitive adhesive by polymerizing a block copolymer from a (meth)acrylate monomer. In this case, bulk resistance decreases as the proportion occupied by the electroconductive adhesive increases, and the bulk resistance decreases to approximately $10^{-3}$ Ωcm. However, since metals such as silver, gold and copper are used as the conductive flakes, transmittance is almost undetectable, and since the particles are heavy, the flakes settle down and cause the adhesive to be further non-uniform.

Due to the lack of electrical conductivity or due to the opaque characteristics, conventional transparent adhesives or electroconductive adhesives are restricted in the applications where transparency is required, such as in displays and touch screens. Also, since most of electroconductive adhesives are formed from expensive metal particles, the electroconductive adhesives are highly expensive. Therefore, there is a demand for the development of an electroconductive transparent adhesive has advantages of low production cost, excellent adhesive power, excellent transmittance and excellent electrical conductivity.

SUMMARY OF THE INVENTION

It is an object of the present invention to provide an electroconductive transparent adhesive composition having electrical conductivity and transparency, while exhibiting excellent mechanical strength and adhesive power.

It is another object of the present invention to provide an electroconductive transparent adhesive produced by polymerizing the electroconductive transparent adhesive composition.

The definitions for the terms used in the present specification are as follows.

Unless particularly stated otherwise in the present specification, an aliphatic hydrocarbon means a compound which is composed of carbon atoms and hydrogen atoms, and in which carbon atoms are bonded in a straight chain form, a branched form, or a non-aromatic cyclic form, or a derivative thereof. Aliphatic hydrocarbons are divided into saturated aliphatic hydrocarbons and unsaturated aliphatic hydrocarbons, and the saturated aliphatic hydrocarbons are referred to as methane-based hydrocarbons (alkanes), while the unsaturated aliphatic hydrocarbons can be classified into alkenes containing double bonds, alkynes containing triple bonds, and compounds containing both double bonds and triple bonds.

Furthermore, an aromatic hydrocarbon means a monocyclic or polycyclic compound containing one or more benzene rings, or a derivative thereof, and examples thereof include toluene, xylene and the like, in which an alkyl side chain is bonded to a benzene ring; biphenyl and the like, in which two or more benzene rings are linked by a single bond; fluorene, xanthenes, anthraquinone and the like, in which two or more benzene rings are linked via a cycloalkyl group or a heterocycloalkyl group; and naphthalene, anthracene and the like, in which two or more benzene rings are condensed.

Unless particularly stated otherwise in the present specification, alkyl groups include primary alkyl groups, secondary alkyl groups, and tertiary alkyl groups.

Unless particularly stated otherwise in the present specification, an alkanediyl group is a divalent atomic group obtainable by extracting two hydrogen atoms from an alkane, and may be represented by the formula: —$C_nH_{2n}$—.

An arylene group is a divalent atomic group obtained by extracting two hydrogen atoms from an aryl group, and may be represented by the formula: —$C_nH_{n-2}$—.

Unless particularly stated otherwise in the present specification, all the compounds and substituents may be substituted or unsubstituted. Here, the term substituted means that a hydrogen atom has been replaced by any one selected from the group consisting of a halogen atom, a hydroxyl group, a carboxyl group, a cyano group, a nitro group, an amino group, a thio group, a methylthio group, an alkoxy group, a nitrile group, an aldehyde group, an epoxy group, an ether group, an ester group, a carbonyl group, an acetal group, a ketone group, an alkyl group, a perfluoroalkyl group, a cycloalkyl group, a heterocycloalkyl group, an allyl group, a benzyl group, an aryl group, a heteroaryl group, derivatives thereof, and combinations thereof.

Unless particularly stated otherwise in the present specification, a halogen atom means any one atom selected from the group consisting of fluorine, chlorine, bromine, and iodine.

Unless particularly stated otherwise in the present specification, the prefix "hetero-" means that one to three carbon atoms are substituted by heteroatoms selected from the group consisting of N, O, S and P. For example, a heteroaromatic hydrocarbon may be a compound in which one to three carbon atoms among the carbon atoms of a benzene group are substituted by heteroatoms.

Unless particularly stated otherwise in the present specification, an aliphatic hydrocarbon means an aliphatic hydrocarbon having 1 to 30 carbon atoms, an alkyl group means a linear or branched alkyl group having 1 to 30 carbon atoms, and a heteroalkyl group means a heteroalkyl group having 1 to 30 carbon atoms. An alkanediyl group means an alkanediyl group having 1 to 30 carbon atoms, an alkoxy group means an alkoxy group having 1 to 10 carbon atoms, a perfluoroalkyl group means a perfluoroalkyl group having 1 to 10 carbon atoms, and a perfluoroalkoxy group means a perfluoroalkoxy group having 1 to 10 carbon atoms. An allyl group means an allyl group having 2 to 10 carbon atoms, a cycloalkyl group means a cycloalkyl group having 3 to 32 carbon atoms, and a heterocycloalkyl group means a heterocycloalkyl group having 2 to 32 carbon atoms. An aromatic hydrocarbon means an aromatic hydrocarbon having 2 to 30 carbon atoms, an aryl group means an aryl group having 6 to 30 carbon atoms, an arylene group means an arylene group having 6 to 30 carbon atoms, and a heteroaryl group means a heteroaryl group having 2 to 30 carbon atoms.

In order to achieve the purpose described above, the electroconductive transparent adhesive composition according to an embodiment of the present invention contains a transparent adhesive monomer, any one electroconductive mesoporous filler selected from the group consisting of porous carbon, an electroconductive polymer and combinations thereof, and a polymerization initiator.

The porous carbon may have an average diameter of pores of 0.5 nm to 1 μm, a specific surface area of 0.01 m$^2$/g or more, and a specific pore volume of 0.01 cm$^3$/g or more.

The electroconductive polymer may be any one selected from the group consisting of polyacetylene, polypyrrole, polythiophene, poly(3-alkylthiophene), polyphenylene sulfide, poly-para-phenylene sulfide, polyphenylenevinylene, poly-para-phenylenevinylene, polythienylenevinylene, polyphenylene, poly-para-phenylene, polyazulene, polyfuran, polyaniline, polyselenophene, polytellurophene, derivatives thereof, and combinations thereof.

The transparent adhesive monomer may be any one selected from the group consisting of acrylic monomers, epoxy-based monomers, ether-based monomers, and combinations thereof.

The electroconductive transparent adhesive composition may contain 0.001 parts to 100 parts by weight of the electroconductive mesoporous filler, 0.001 parts to 100 parts by weight of the initiator, and 0 parts to 1000 parts by weight of an organic solvent, relative to 100 parts by weight of the transparent adhesive monomer.

The electroconductive transparent adhesive composition may further contain a compound represented by the following Formula (1):

[Chemical Formula 1]

wherein in the Formula (1), $R_1$ represents any one selected from the group consisting of a hydrogen atom and an alkyl group;

$R_2$ and $R_4$ each independently represent an alkanediyl group;

$R_3$ represents any one selected from the group consisting of a divalent to tetravalent aliphatic hydrocarbon group, a divalent to decavalent aromatic hydrocarbon group, a divalent to decavalent heteroaromatic hydrocarbon group, S, $SO_2$, O, CO, $C(CH_3)_2$, $C(CF_3)_2$, $NR_5$, and combinations thereof; $R_5$ represents any one selected from the group consisting of a hydrogen atom and an alkyl group;

X and Z each independently represent any one selected from the group consisting of N, O, S, CO, and combinations thereof;

Y represents any one selected from the group consisting of O, S, CO, and combinations thereof;

L and O each independently represent an integer from 0 to 30;

M and N each independently represent an integer from 1 to 5; and

P and Q each independently represent an integer of 1 or 2.

The electroconductive transparent adhesive composition may contain the compound represented by Formula (1) in an amount of 0.001 parts to 100,000 parts by weight relative to 100 parts by weight of the transparent adhesive monomer.

According to another embodiment of the present invention, there is provided an electroconductive transparent adhesive containing a composite of the transparent adhesive monomer and the electroconductive mesoporous filler, which is produced by polymerizing the electroconductive transparent adhesive composition.

Hereinafter, the present invention will be described in more detail.

The electroconductive transparent adhesive composition contains a transparent adhesive monomer, any one electroconductive mesoporous filler selected from the group consisting of porous carbon, an electroconductive polymer and combinations thereof, and a polymerization initiator.

In the electroconductive transparent adhesive composition, the transparent adhesive monomer and the electroconductive mesoporous filler are mixed into a mixture, and the mixture is polymerized by using the polymerization initiator, so that the transparent adhesive monomer and the electroconductive mesoporous filler form a composite.

Since the electroconductive mesoporous filler has pores and has a large surface area per unit mass and a large pore volume per unit mass, the transparent adhesive composition undergoes polymerization within the pores of the mesoporous filler, and the transparent adhesive composition and the mesoporous filler form a composite. Accordingly, the extent of the fine particles of the mesoporous filler aggregating together is low, and thus the mesoporous filler can be highly dispersed. Also, an electroconductive transparent adhesive composition which can have both excellent electrical conductivity and excellent transmittance even at a small mass proportion, can be produced.

The composite of the transparent adhesive monomer and the electroconductive mesoporous filler can be produced by photopolymerizing the monomer by irradiating light, or by thermally polymerizing the monomer at a temperature of −50° C. to 200° C. If the reaction temperature is lower than −50° C., the reaction may not occur efficiently, and if the reaction temperature is higher than 200° C., there may be a problem that the compound thus formed undergoes decomposition.

The porous carbon may be in the form of any one selected from the group consisting of carbon black, acetylene black, carbon fiber, fullerene, carbon nanorods, carbon nanopipes, carbon nanotubes, carbon nanowires, carbon nanohorns, carbon nanorings, and combinations thereof.

The porous carbon can be produced in an inversely replicated form by nanocasting from porous silica templates having various structures. Examples of the porous silica include MCM-x (MCM-41, MCM-48, MCM-50), SBA-x (SBA-1, SBA-2, SBA-3, SBA-4, SBA-6, SBA-7, SBA-8, SBA-11, SBA-12, SBA-15, SBA-16), FDU-x (FDU-1, FDU-2, FDU-5, FDU-11, FDU-12, FDU-13), KIT-x (KIT-5, KIT-6), FSM-x (FSM-16), CMI-x (CMI-1), UK-x (UK-1), JLU-x (JLU-14, JLU-15, JLU-20), IBN-x (IBN-1, IBN-2, IBN-4, IBN-5), CK-x (CK-2), KSW-x (KSW-2), DAM-x (DAM-1), MSU-x (MSU-1, MSU-2, MSU-3, MSU-H, MSU-J), AMS-x (AMS-8), TUD-x (TUD-1), and HMS. Regarding the porous silica, the pore size, wall thickness, pore volume and the like of the porous silica can be adjusted by regulating the temperature in the stage of aging the porous silica during the production of het porous silica.

The porous carbon can be produced into an inversely replicated structure of the porous silica by adding an organic material capable of providing carbon element into the pores of the porous silica, and then subjecting the organic material to a carbonization process using a catalyst.

Regarding the porous carbon, CMK-x (CMK-1, CMK-2, CMK-3, CMK-4, CMK-5, G-CMK-3), C-FDU-x (C-FDU-14, C-FDU-15, C-FDU-16), SNU-x (SNU-1, SNU-2), NCC-x (NCC-1, NCC-2, NCC-3), OMC(N-OMC), NCS-1 and the like can be used, but the present invention is not intended to be limited thereto.

Furthermore, regarding the porous carbon, a porous carbon impregnated with a solution containing any one selected from the group consisting of a heteroatom element, a transition metal, a compound of a transition metal, and combinations thereof; a porous carbon doped with any one selected from the group consisting of a heteroatom element, a transition metal, a compound of a transition metal, and combinations thereof; a porous carbon coated with a substance for increasing surface conductivity (for example, an electroconductive polymer); or a composite produced from porous carbon can be used.

The porous carbon may have an average diameter of pores of 0.5 nm to 1 μm, and preferably 1 nm to 100 nm; a specific surface area of 0.01 $m^2/g$ or larger, and preferably 50 $m^2/g$ to 20,000 $m^2/g$; and a specific pore volume of 0.01 $cm^3/g$ or larger, and preferably 0.5 $cm^3/g$ to 5 $cm^3/g$. When the average diameter of pores, specific surface area or specific pore volume of the porous carbon is in the range described above, the transparent adhesive monomer is polymerized inside and outside the pores of the electroconductive mesoporous filler, and a composite of the transparent adhesive monomer and the electroconductive mesoporous filler can be produced. Thus, by means of the composite, an adhesive having excellent electrical conductivity, as well as excellent transmittance and tensile strength can be provided.

As the electroconductive polymer, any one selected from the group consisting of polyacetylene, polypyrrole, polythiophene, poly(3-alkylthiophene), polyphenylene sulfide, poly-para-phenylene sulfide, polyphenylenevinylene, poly-para-phenylenevinylene, polythienylenevinylene, polyphenylene, poly-para-phenylene, polyazulene, polyfuran, polyaniline, polyselenophene, polytellurophene, derivatives thereof, and combinations thereof can be used, but the present invention is not intended to be limited thereto.

The electroconductive polymer may be doped with a dopant. When the electroconductive polymer is doped with a dopant, the conductivity of the electroconductive transparent adhesive composition can be further increased.

As the doping material, use can be made of a compound in the form of a salt capable of ionizing in an aqueous phase or non-aqueous phase solvent, and a compound which can acquire a positive charge or a negative charge through a reaction with an acid, a salt thereof or a mixture thereof. An acid, an oxidizing agent (p-type dopant), a reducing agent (n-type dopant) and the like can be used.

That is, as the doping material, substituted or unsubstituted sulfuric acid, for example, dodecylbenzenesulfonic acid, 2-acryloamido-1-propanesulfonic acid, or camphor-sulfonic acid can be used, and any one selected from the group consisting of salts between a group of anions (for example, $PF_6^-$, $BF_6^-$, $BF_4^-$, $CF_3SO_3^-$, $N(CF_3SO_2)_2^-$, $Cl^-$, $SO_4^{2-}$, $ClO_4^-$, and F) and a group of cations (for example, gold ion, platinum ion, iron ion, copper ion, lithium ion, sodium ion, potassium ion, calcium ion, arsenic ion, and tetrabutylammonium ion), oxidizing agents and reducing agents that can dope polymers through oxidation-reduction, alkyls having 1 to 30 carbon atoms, aryl halides, acid anhydrides, derivatives thereof, and combinations thereof can be used, but the present invention is not intended to be limited thereto.

Furthermore, as the doping material, any one selected from the group consisting of vapors such as iodine ($I_2$), bromine ($Br_2$), and chlorine ($Cl_2$), and combinations thereof can be used, but the present invention is not intended to be limited thereto.

When the electroconductive polymer is doped, any one selected from the group consisting of N-methylpyrrolidinone (NMP), dimethyl sulfoxide (DMSO), dimethyl formamide (DMF), acetonitrile, propylene carbonate, pyridine, toluene, xylene, cresol, m-cresol, phenol, dimethylacetamide, tetramethylurea, n-cyclohexylpyrrolidinone, aqueous acetic acid, aqueous formic acid, pyrrolidinone, N,N'-dimethylpropylene urea (DMPU), benzyl alcohol, water, and combinations thereof can be used, but the present invention is not intended to be limited thereto.

Furthermore, the electroconductive polymer can be produced in a form having mesopores through a template replication method. The average diameter of the pores may be 0.5 nm to 1 μgym, and preferably 1 nm to 100 nm; the specific surface area may be 0.01 m$^2$/g or larger, and preferably 50 m$^2$/g to 20,000 m$^2$/g; and the specific pores volume may be 0.01 cm$^3$/g or larger, and preferably 0.5 cm$^3$/g to 5 cm$^3$/g. When the average diameter of pores, specific surface area, or specific pore volume of the electroconductive polymer is in the range described above, the transparent adhesive monomer is polymerized inside and outside the pores of the electroconductive mesoporous filler, and thereby, a composite of the transparent adhesive monomer and the electroconductive mesoporous filler can be produced. Thus, by means of the composite, an adhesive having excellent conductivity as well as excellent transmittance and tensile strength can be provided.

The transparent adhesive monomer may be any one selected from the group consisting of acrylic monomers, epoxy-based monomers, ether-based monomers, and combinations thereof.

Regarding the acrylic monomers, an acrylic monomer containing an alkyl group having 1 to 16 carbon atoms can be preferably used. Specific examples of the acrylic monomers that can be used include, as alkyl (meth)acrylates, methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, pentyl (meth)acrylate, isopentyl (meth)acrylate, 2-methylbutyl (meth)acrylate, hexyl (meth)acrylate, 2-methylpentyl (meth)acrylate, 3-methylpentyl (meth)acrylate, 4-methylpentyl (meth)acrylate, 2-ethylbutyl (meth)acrylate, cyclohexyl (meth)acrylate, heptyl (meth)acrylate, octyl (meth)acrylate, 2-methylheptyl (meth)acrylate, 2-ethylhexyl (meth)acrylate, isooctyl (meth) acrylate, nonyl (meth)acrylate, isononyl (meth)acrylate, decyl (meth)acrylate, undecyl (meth)acrylate, dodecyl (meth)acrylate, tridecyl (meth)acrylate, tetradecyl (meth) acrylate, pentadecyl (meth)acrylate, hexadecyl (meth)acrylate, benzyl (meth)acrylate, isobornyl (meth)acrylate, and allyl (meth)acrylate; as hydroxyalkyl (meth)acrylates, 2-hydroxyethyl (meth)acrylate, 2-hydroxypropyl (meth)acrylate, and 4-hydroxybutyl (meth)acrylate; as vinylcarboxylic acids, (meth)acrylic acid, β-acryloyloxypropionic acid, aconitic acid, dimethylacrylic acid, crotonic acid, fumaric acid, itaconic acid, and 5-acryloyloxypentanoic acid, and as acrylates containing nitrogen atoms or other acrylates, N,N-dimethylacrylamide, dimethylaminomethyl (meth)acrylate, diethylaminoethyl (meth)acrylate, dimethylaminoethyl (meth) acrylate, diethylaminoethyl (meth)acrylate, N-vinyl-2-pyrrolidone, N-vinylcaprolactam, tetrahydrofurfuryl (meth) acrylate, 2-phenoxyethyl acrylate, hydroxyethyl (meth) acrylate, methacryloyl chloride, hydroxyethyl (meth) acrylate, 2,4-bisethyloxy(meth)acrylate-6-chloro-1,3,5-triazine, 2-ethyloxy(meth)acrylate-4,6-dichloro-1,3,5-triazine, 2,4-bisethylthioxy(meth)acrylate-6-chloro-1,3,5-triazine, 2-ethylthioxy(meth)acrylate-4,6-dichloro-1,3,5-triazine, diphenyl sulfide-4-ethyloxy(meth)acrylate, 4'-carboxylic acid, monomethacrylate of a polyalkylene glycol having an alkylene group having 1 to 20 carbon atoms, and monoacrylate of a polyalkylene glycol having an alkylene group having 1 to 20 carbon atoms. However, the present invention is not intended to be limited thereto.

Furthermore, as the epoxy-based monomers, glycidyl (meth)acrylate, α-methylglycidyl (meth)acrylate, a cycloaliphatic epoxy, and the like can be used, and specifically, regarding the cycloaliphatic epoxy, any one compound selected from the group consisting of compounds represented by the following Formulae (3-1) to (3-5) can be used. However, the present invention is not intended to be limited thereto.

[Chemical Formula 3-1]

[Chemical Formula 3-2]

[Chemical Formula 3-3]

[Chemical Formula 3-4]

[Chemical Formula 3-5]

wherein in the Formulae (3-1) to (3-5), $R_{51}$ represents any one selected from the group consisting of hydrogen, an alkyl group having 1 to 16 carbon atoms, and a cycloalkyl group having 3 to 8 carbon atoms; $n_{51}$ represents an integer from 0 to 6; $n_{52}$ represents an integer from 0 to 8; and $n_{53}$ represents an integer from 0 to 10.

Regarding the ether-based monomer, a compound represented by the following Formula (4) can be used, but the present invention is not intended to be limited thereto.

$R^1-O-R^2$     [Chemical Formula 4]

wherein in the Formula (4), $R^1$ represents any one selected from the group consisting of an epoxy group, a (meth)acrylate group, and combinations thereof; and $R^2$ represents any one selected from the group consisting of an epoxy group, a (meth)acrylate group, an alkyl group, and an aryl group. In the compound represented by the Formula (4), $R^1$ may have two or more of the epoxy group or the (meth)acrylate group.

Specific examples of the compound represented by the Formula (4) that can be used include 2-(oxiran-2-ylmethoxy) ethyl (meth)acrylate, 2-(2-(oxiran-2-ylmethoxy)ethoxy) ethyl (meth)acrylate, 2-(oxiran-2-ylmethoxy)butyl (meth) acrylate, N-(meth)acryloyl-N-(2-(oxiran-2-ylmethoxy) ethyl)(meth)acrylate, 2,2-bis(oxiran-2-ylmethoxy)ethyl (meth)acrylate, N-(2,2-bis(oxiran-2-ylmethoxy)ethyl)-N-(meth)acryloyl(meth)acrylamide, 2,5-dimethyl-4-(oxiran-2-ylmethoxy)phenyl(meth)acrylate, 2-(2,5-dimethyl-4-(oxiran-2-ylmethoxy)phenoxy)ethyl (meth)acrylate, S-2,5- dimethyl-4-(oxiran-2-ylmethoxy)phenyl 2-methylprop-2-enethioate, 2-(4-(2-(4-(2-(oxiran-2-yl)ethyl)phenyl)propan-2-yl)phenoxy)ethyl (meth)acrylate, and 2-(4-(4-(2-(oxiran-2-yl)ethyl)phenylsulfonyl)phenoxy)ethyl (meth)acrylate, but the present invention is not intended to be limited thereto.

As the polymerization initiator, use can be made of radical initiators such as 1,1'-azobis(cyclohexanecarbonitrile), 2,2'-azobis(2-methylpropionamidine)dihydrochloride, 2,2'-azobis(2-methylpropionitrile), 4,4'-azobis(4-cyanovaleric acid), ammonium persulfate, hydroxymethanesulfonic acid monosodium salt dihydrate, potassium persulfate, sodium persulfate, 1,1-bis(tert-amylperoxy)cyclohexane, 1,1-bis(tert-butylperoxy)-3,3,5-trimethylcyclohexane, 1,1-bis(tert-butyl peroxy)cyclohexane, 2,2-bis(tert-butylperoxy)butane, 2,4-pentanedione peroxide, N-methyl-2-pyrrolidone, 2,5-bis (tert-butylperoxy)-2,5-dimethylhexane, 2,5-di(tert-butylperoxy)-2,5-dimethyl-3-hexyne, cumene hydroperoxide, 1,1,1-tris(2-bromoisobutyryloxymethyl)ethane, 10-undecenyl 2-bromoisobutyrate, 2-hydroxyethyl 2-bromoisobutyrate, 4,4'-dinonyl-2,2'-dipyridyl, bis[2-(2'-bromoisobutyryloxy) ethyl]disulfide, dipentaerythritol hexakis(2-bromoisobutyrate), 2-(dodecylthiocarbonothioylthio)-2-methylpropionic acid, 2-cyano-2-propyl benzodithioate, 2-cyano-2-propyl dodecyl trithiocarbonate, 4-cyano-4-(phenylcarbonothioylthio)pentanoic acid, 4-cyano-4-[(dodecylsulfanylthiocarbonyl)sulfanyl]pentanoic acid, bis (dodecylsulfanylthiocarbonyl)disulfide, bis(thiobenzoyl) disulfide, cyanomethyl dodecyl trithiocarbonate, cyanomethyl methyl(phenyl)carbamodithioate, dodecyl 2-bromoisobutyrate, ethylene bis(2-bromoisobutyrate), N,N, N',N",N"-pentamethyldiethylenetriamine, N-tert-butyl-N-(2-methyl-1-phenylpropyl)-O-(1-phenylethyl)hydroxylamine, N-tert-butyl-O-[1-[4-(chloromethyl)phenyl]ethyl]-N-(2-methyl-1-phenylpropyl)hydroxylamine, octadecyl 2-bromoisobutyrate, 2,2,6,6-tetramethyl-1-piperidinyloxy, tris(2-pyridylmethyl)amine, tris-[2-(dimethylamino)ethyl] amine, 2,2'-azobis(2-methylpropionamidine)dihydrochloride, and hexabutyldistannane; triphenylsulfonium hexafluorophosphorus, triphenylsulfonium hexafluoroarsenate, triphenylsulfonium hexafluoroantimonate, diaryliodonium hexafluorophosphorus, diaryliodonium hexafluoroarsenate, and diaryliodonium hexafluoroantimonate; and ion initiators such as sulfonium salts, phosphonium salts, arsenate salts, antimonate salts, and copper(I) chloride. However, the present invention is not intended to be limited thereto.

The electroconductive transparent adhesive composition may contain 0.001 parts to 100 parts by weight of the electroconductive mesoporous filler, 0.001 parts to 100 parts by weight of the initiator, and 0 parts to 1000 parts by weight of the organic solvent, relative to 100 parts by weight of the transparent adhesive monomer, and preferably, the composition may contain 0.1 parts to 20 parts by weight of the electroconductive mesoporous filler, 0.01 parts to 5 parts by weight of the initiator, and 100 parts to 500 parts by weight of the organic solvent.

When the contents of the transparent adhesive monomer, the electroconductive mesoporous filler, the initiator, and the organic solvent are in the ranges described above, the transparent adhesive monomer is polymerized inside and outside the pores of the electroconductive mesoporous filler, and a composite of the transparent adhesive monomer and the electroconductive mesoporous filler can be produced. Thus, by means of the composite, an adhesive having excellent electrical conductivity as well as excellent transmittance and tensile strength can be provided.

If the content of the polymerization initiator is less than 0.001 parts by weight, the transparent adhesive monomer is not sufficiently polymerized, and adhesive characteristics may not be exhibited. If the content is more than 100 parts by weight, the electroconductive transparent adhesive composition may be solidified.

The transparent adhesive monomer and the polymerization initiator can be polymerized by stirring for 10 seconds to 10 days at 0° C. to 300° C., and preferably can be polymerized by stirring for 3 minutes to 5 hours at 60° C. to 150° C. If the reaction temperature is lower than 0° C., or the reaction time is less than 10 seconds, the polymerization initiator may not accomplish the role of the initiator, and if the reaction temperature is higher than 300° C., or the reaction time is long than 10 days, the transparent adhesive monomer compound may be decomposed.

The organic solvent can be selectively used so as to adjust the concentration of the electroconductive transparent adhesive composition. If the content of the organic solvent is more than 1000 parts by weight relative to 100 parts by weight of the transparent adhesive monomer, the adhesive characteristics of the electroconductive transparent adhesive composition may not be exhibited.

Regarding the organic solvent, any one selected from the group consisting of chloroform, methanol, ethanol, isopropanol, n-butanol, methylisocarbinol, acetone, 2-butanone, ethyl methyl ketone, ethyl amyl ketone, diacetone alcohols, isophorone, cyclohexanone, N,N-dimethylformamide, N,N-dimethylacetoamide, diethyl ether, diisopropyl ether, tetrahydrofuran, 1,4-dioxane, 3,4-dihydro-2H-pyran, 2-methoxyethanol, 2-ethoxyethanol, 2-butoxyethanol, ethylene glycol dimethyl ether, methyl acetate, ethyl acetate, isobutyl acetate, amyl acetate, ethyl lactate, ethylene carbonate, benzene, toluene, xylene, hexane, peptane, isooctane, cyclohexane, methylene chloride, 1,2-dichloroethane, dichloropropane, chlorobenzene, dimethyl sulfoxide, N-methyl-2-pyrrolidone, tetrachloroethane, and N-octyl-2-pyrrolidone can be used, but the present invention is not intended to be limited thereto.

In order to enhance the performance of the finally obtained adhesive, the electroconductive transparent adhesive composition should have its various components stabilized; however, since the components may be decomposed in the course of raw material preparation, storage, adhesive production, or the like, it is preferable to prevent the above-described phenomenon by adding a UV stabilizer. Furthermore, the adhesive composition may further contain, in addition to the UV stabilizer, various conventional additives, for example, additives such as a tackifier, a plasticizer, a softener, a filler, a stabilizer, an anti-oxidant, a pigment, and a coating material.

Examples of the UV stabilizer that can be used include 2-chloro-4'-fluorobenzophenone, 4-chloro-5'-fluoro-2'-hydroxybenzophenone, 4-chloro-4'-hydroxybenzophenone, 2,4-difluorobenzophenone, 3,4-difluorobenzophenone, 4,4'-difluorobenzophenone, 2,4-dihydroxybenzophenone, 4,4'-dihydroxybenzophenone, 2,4'-dimethylbenzophenone, 3,4'-dimethylbenzophenone, 3,4-dimethylbenzophenone, 2,5-dimethylbenzophenone, 4,4'-dimethylbenzophenone, trimethoxybenzophenone, 2,2',4-trihydroxybenzophenone, 2,3,4'-trihydroxybenzophenone, 2,4,4'-trihydroxybenzophenone, 2,4,6-trihydroxybenzophenone, 2,3,4-trimethoxybenzophenone, 2,4,5-trimethoxybenzophenone, 2,4,6-trimethoxybenzophenone, 2,4',5-trifluorobenzophenone, 2,3,4,4'-tetrahydroxybenzophenone, and 2,2',4,4'-tetrahydroxybenzophenone.

The electroconductive transparent adhesive composition may further contain a compound represented by the following Formula (1):

[Chemical Formula 1]

In the Formula (1), $R_1$ may represent any one selected from the group consisting of a hydrogen atom and an alkyl group.

$R_2$ and $R_4$ may each independently represent an alkanediyl group, preferably an alkanediyl group having 1 to 20 carbon atoms, more preferably an alkanediyl group having 1 to 10 carbon atoms, and even more preferably an alkanediyl group having 1 to 5 carbon atoms.

$R_3$ may represent any one selected from the group consisting of a divalent to tetravalent aliphatic hydrocarbon group, a divalent to hexavalent aromatic hydrocarbon group, a divalent to hexavalent heteroaromatic hydrocarbon group, S, $SO_2$, O, CO, $C(CH_3)_2$, $C(CF_3)_2$, $NR_5$, and combinations thereof. $R_5$ may represent any one selected from the group consisting of a hydrogen atom and an alkyl group.

X and Z may each independently represent any one selected from the group consisting of N, O, S, CO, and combinations thereof, and preferably any one selected from the group consisting of N, O, S, O—C=O, and S—C=O.

Y may represent any one selected from the group consisting of O, S, CO, and combinations thereof, and preferably any one selected from the group consisting of O, S, O—C=O, and S—C=O.

L and O may each independently represent an integer from 0 to 30, preferably an integer from 0 to 10, and more preferably an integer from 0 to 2.

M and N may each independently represent an integer from 1 to 5, and preferably 1 or 3, and the value of M+N has the same value as the valency of $R_3$.

P and Q may each independently represent an integer of 1 or 2, and for example, P or Q may have a value of 2 when X or Z is N.

The compound represented by the Formula (1) contains at least one or more carbon-carbon unsaturated double bond and an epoxy group at the same time, and since the unsaturated double bond and the epoxy group are both polymerizable, the compound represented by the Formula (1) can form a polymer having a high molecular weight under the action of heat or light, and thereby can produce a transparent adhesive having excellent mechanical strength.

$R_3$ may specifically represent any one selected from the group consisting of compounds represented by the following Formulae (2-1) to (2-4):

[Chemical Formula 2-1]

$(CR_{11}R_{12})n_{11}(CH_2)n_{12}$

[Chemical Formula 2-2]

[Chemical Formula 2-3]

[Chemical Formula 2-4]

In the Formulae (2-1) to (2-4), $R_{11}$, $R_{12}$, $R_{21}$, $R_{32}$, $R_{33}$, $R_{41}$, $R_{42}$ and $R_{43}$ may represent any one selected from the group consisting of a hydrogen atom and an alkyl group; $R_{31}$ may represent any one selected from the group consisting of an alkanediyl group, S, O, CO, $C(CH_3)_2$, $C(CF_3)_2$, $SO_2$, and combinations thereof; $X_{41}$ to $X_{43}$ may each independently represent any one selected from the group consisting of N and CH; $n_{11}$ and $n_{12}$ may each independently represent an integer from 1 to 30; $n_{21}$, $n_{32}$ and $n_{33}$ may each independently represent an integer from 0 to 4; $n_{31}$ may represent an integer from 0 to 1; and $n_{41}$ to $n_{43}$ may each independently represent an integer from 0 to 5.

Specifically, the compound represented by the Formula (1) may be any one selected from the group consisting of compounds represented by the following Formulae (1-1) to (1-12):

[Chemical Formula 1-1]

[Chemical Formula 1-2]

[Chemical Formula 1-3]

[Chemical Formula 1-4]

-continued

[Chemical Formula 1-5]

[Chemical Formula 1-6]

[Chemical Formula 1-7]

[Chemical Formula 1-8]

[Chemical Formula 1-9]

[Chemical Formula 1-10]

[Chemical Formula 1-11]

[Chemical Formula 1-12]

The electroconductive transparent adhesive composition may simultaneously contain any one compound selected from the group consisting of the compounds represented by Formulae (1-1) to (1-9) and combinations thereof, and any one compound selected from the group consisting of the compounds represented by Formulae (1-10) to (1-12) and combinations thereof. When the composition simultaneously contains any one compound selected from the group consisting of the compounds represented by Formulae (1-1) to (1-9) and combinations thereof, and any one compound selected from the group consisting of the compounds represented by Formulae (1-10) to (1-12) and combinations thereof, a transparent adhesive having superior mechanical strength can be produced.

The electroconductive transparent adhesive composition may contain the compound represented by the Formula (1) in an amount of 0.001 parts to 100,000 parts by weight, and preferably 10 parts to 50 parts by weight, relative to 100 parts by weight of the transparent adhesive monomer. If the content of the compound represented by Formula (1) in the electroconductive transparent adhesive monomer is less than 10, the adhesive strength may be weak, and if the content is more than 50, transparency of the adhesive may be poor. The compound represented by the Formula (1) contains at least one or more carbon-carbon unsaturated double bond and an epoxy group at the same time, and since the unsaturated double bond and the epoxy group are both polymerizable, when the content of the compound represented by the Formula (1) is in the range described above, the compound represented by the Formula (1) forms a polymer having a high molecular weight under the action of heat or light, and thereby can produce a transparent adhesive having excellent mechanical strength.

According to another embodiment of the present invention, there is provided an electroconductive transparent adhesive that is produced by polymerizing the electroconductive transparent adhesive composition described above. The method for preparing the adhesive by polymerizing the electroconductive transparent adhesive composition can be carried out by applying a method conventionally used for a general adhesive composition, and therefore, a detailed explanation will not be repeated in the present invention.

The electroconductive transparent adhesive can be produced into an electroconductive transparent adhesive film by a film manufacturing machine or a known film production method. For example, when the electroconductive transparent adhesive composition is applied on two sheets of release films, and the films are pressed under a certain load (about 100 g to 1000 g) at 80° C. to 100° C., an electroconductive transparent adhesive film can be produced. When the release films are removed from the electroconductive transparent adhesive film thus produced, and then the adhesive film is interposed between two sheets of films to be bonded and cured under a certain load (about 100 g to 1000 g) at 80° C. to 100° C., the two sheets of films can be bonded. Alternatively, the electroconductive transparent adhesive composition may be prepared in a prepolymerization state and mixed with a monomer, an initiator, a UV stabilizer and the like, and the mixture may be applied between films and photocured by exposing the mixture to a UV radiation having a wavelength of 254 nm or 356 nm at a dose of 10 mJ/cm² to 100,000 mJ/cm².

The electroconductive transparent adhesive composition according to embodiments of the present invention can produce a transparent adhesive film having excellent electrical conductivity as well as excellent transparency and mechanical strength.

DETAILED DESCRIPTION OF THE EMBODIMENTS

Hereinafter, embodiments of the present invention will be described in detail so that those having ordinary skill in the art can easily carry out the present invention. However, the present invention can be realized in various different forms, and is not intended to be limited to the Examples described herein.

Unless particularly stated otherwise, the reagents used in the following Examples were purchased for use from Sigma-Aldrich Company (USA), Tokyo Chemical Industry Co., Ltd. (Japan), and Merck GmbH (Germany), or were synthesized by known methods. Furthermore, the solvents used in the reactions were purchased from Sigma-Aldrich Company (USA) or Duksan Scientific Corp.

[Properties Measurement Methods]

The properties of the compositions prepared in the following Examples and Comparative Examples, for example, molecular weight, thickness of the film, transmittance, refractive index, tensile strength, and degree of peeling, were measured by the following methods.

(1) Number Average Molecular Weight

An electroconductive transparent adhesive composition prepared as described above was dissolved in tetrahydrofuran (THF), and the number average molecular weight was measured using gel permeation chromatography (GPC).

(2) Thickness (nm)

An electroconductive transparent adhesive composition prepared as described above was applied on one surface of an ITO film, and the composition was polymerized. Subsequently, the thickness of the adhesive film thus produced was measured using a thin film thickness meter.

(3) Transmittance (%)

For an adhesive film thus produced, transmittance at 600 nm was measured using a UV spectrometer.

Preparation Example 1

Preparation of Transparent Adhesive Monomer Composition

Transparent adhesive monomer compositions were prepared by varying the constituent components, composition ratio, production conditions and the like as indicated in the following Table 1. Furthermore, the number average molecular weights of the transparent adhesive monomer compositions thus prepared were measured, and the results are also presented in the following Table 1. The transparent adhesive monomer compositions prepared in Table 1 include a prepolymerization stage for preventing the occurrence that when a transparent adhesive monomer which is volatile or has a low boiling point is polymerized, the monomer evaporates, and an adhesive film is not formed.

TABLE 1

| Transparent adhesive monomer composition | Constituent component (weight, g) | | | Composition production conditions Temperature/ stirring time | Results Number average molecular weight |
|---|---|---|---|---|---|
| | Solvent[1] | Monomer[2] | Initiator[3] | | |
| 1 | EA(90) | 2-EHA(50) BA(45) AA(5) | AIBN(1) | 60° C. | — |
| 2 | EA(90) | 2-EHA(50) BA(45) AA(5) | AIBN(1) | 80° C./20 min | 289300 |
| 3 | EA(90) | 2-EHA(50) BA(45) AA(5) | AIBN(1) | 100° C./5 min | gelation |
| 4 | EA(90) | 2-EHA(50) BA(45) AA(5) | AIBN(1) | 120° C./1 min | gelation |
| 5 | EA(90) | 2-EHA(50) BA(45) AA(5) | BPO(1) | 70° C./5 h | 210900 |
| 6 | EA(90) | 2-EHA(50) BA(45) AA(5) | AIBN(0.5)/ BPO(0.5) | 80° C./30 min | 197800 |
| 7 | CHCl3(90) | 2-EHA(50) BA(45) AA(5) | AIBN(1) | 90° C./30 min | 219500 |
| 8 | CHCl3(90) | 2-EHA(50) BA(45) AA(5) | AIBN(0.5)/ BPO(0.5) | 80° C./40 min | 231500 |
| 9 | THF(90) | 2-EHA(50) BA(45) AA(5) | AIBN(1) | 90° C./30 min | 194800 |
| 10 | THF(90) | 2-EHA(50) BA(45) AA(5) | AIBN(0.5)/ BPO(0.5) | 80° C./20 min | 224100 |
| 11 | iPA | 2-EHA(50) BA(45) AA(5) | AIBN(0.5)/ BPO(0.5) | 70° C./40 min | 99300 |
| 12 | EA(90) | 2-EHA(50) BA(45) IBA(20) AA(5) | AIBN(1) | 60° C. | — |

TABLE 1-continued

| Transparent adhesive monomer composition | Constituent component (weight, g) | | | Composition production conditions Temperature/ stirring time | Results Number average molecular weight |
|---|---|---|---|---|---|
| | Solvent[(1)] | Monomer[(2)] | Initiator[(3)] | | |
| 13 | EA(90) | 2-EHA(50) BA(45) IBA(20) AA(5) | AIBN(1) | 80° C./20 min | 254600 |
| 14 | EA(90) | 2-EHA(50) BA(45) IBA(20) AA(5) | AIBN(1) | 100° C./5 min | gelation |
| 15 | EA(90) | 2-EHA(50) BA(45) IBA(20) AA(5) | AIBN(1) | 120° C./1 min | gelation |
| 16 | EA(90) | 2-EHA(50) BA(45) IBA(20) AA(5) | BPO(1) | 70° C./5 h | 191900 |
| 17 | EA(90) | 2-EHA(50) BA(45) IBA(20) AA(5) | AIBN(0.5)/ BPO(0.5) | 80° C./30 min | 176000 |
| 18 | CHCl3(90) | 2-EHA(50) BA(45) IBA(20) AA(5) | AIBN(1) | 90° C./30 min | 197600 |
| 19 | CHCl3(90) | 2-EHA(50) BA(45) IBA(20) AA(5) | AIBN(0.5)/ BPO(0.5) | 80° C./40 min | 213000 |
| 20 | THF(90) | 2-EHA(50) BA(45) IBA(20) AA(5) | AIBN(1) | 90° C./30 min | 171400 |
| 21 | THF(90) | 2-EHA(50) BA(45) IBA(20) AA(5) | AIBN(0.5)/ BPO(0.5) | 80° C./20 min | 200600 |
| 22 | iPA | 2-EHA(50) BA(45) IBA(20) AA(5) | AIBN(0.5)/ BPO(0.5) | 70° C./40 min | 91300 |

[(1)]Solvent
EA: Ethyl acetate, CHCl3: chloroform, THF: tetrahydrofuran, iPA: isopropanol
[(2)]Monomer
2-EHA: 2-Ethylhexyl acrylate, BA: butyl acrylate, IBA: isobornyl acrylate, AA: acrylic acid
[(3)]Initiator
AIBN: 2,2'-Azobis(2-methylpropionitrile), BPO: benzoyl peroxide Preparation Example 2

Preparation of Electroconductive Transparent Adhesive Composition

Electroconductive transparent adhesive compositions were prepared using the electroconductive transparent adhesive composition 2 of Table 1, by varying the constituent components, composition ratio, production conditions or the like as indicated in the following Table 2. However, the production conditions for the transparent adhesive monomer composition 2 shown in the Table 1 can be carried out before the transparent adhesive monomer composition 2 and the constituent components of the following Table 2 are mixed.

TABLE 2

| | Constituent component (weight, g) | | | | Composition production conditions ° C./min |
|---|---|---|---|---|---|
| | Transparent adhesive monomer composition | Electroconductive mesoporous filler[(4)] | Solvent[(5)] | Additive[(6)] | |
| Comparative Example 1 | 2 (191) | 0 | 0 | 0 | 80° C./30 min |
| Example 1 | 2 (184) | CMK-3(100) (3) | 0 | 0 | 80° C./30 min |

TABLE 2-continued

| | Constituent component (weight, g) | | | | Composition production conditions ° C./min |
|---|---|---|---|---|---|
| | Transparent adhesive monomer composition | Electroconductive mesoporous filler[4] | Solvent[5] | Additive[6] | |
| Example 2 | 2 (186) | CMK-3(100) (2) | 0 | 0 | 90° C./20 min |
| Example 3 | 2 (186) | CMK-3(100) (2) | THF(10) | 0 | 90° C./20 min |
| Example 4 | 2 (188) | CMK-3(100) (1) | 0 | 0 | 100° C./10 min |
| Example 5 | 2 (184) | CMK-3(130) (3) | 0 | 0 | 80° C./30 min |
| Example 6 | 2 (186) | CMK-3(130) (2) | 0 | 0 | 90° C./20 min |
| Example 7 | 2 (186) | CMK-3(130) (2) | THF(10) | 0 | 90° C./20 min |
| Example 8 | 2 (188) | CMK-3(130) (1) | 0 | 0 | 100° C./10 min |
| Example 9 | 2 (190) | CMK-3(150) (0.1) | 0 | 0 | 80° C./30 min |
| Example 10 | 2 (189) | CMK-3(150) (0.5) | 0 | 0 | 80° C./30 min |
| Example 11 | 2 (188) | CMK-3(150) (1) | 0 | 0 | 80° C./30 min |
| Example 12 | 2 (186) | CMK-3(150) (2) | 0 | 0 | 80° C./30 min |
| Example 13 | 2 (184) | CMK-3(150) (3) | 0 | 0 | 80° C./30 min |
| Example 14 | 2 (182) | CMK-3(150) (4) | 0 | 0 | 80° C./30 min |
| Example 15 | 2 (180) | CMK-3(150) (5) | 0 | 0 | 80° C./30 min |
| Example 16 | 2 (171) | CMK-3(150) (10) | 0 | 0 | 80° C./30 min |
| Example 17 | 2 (152) | CMK-3(150) (20) | 0 | 0 | 80° C./30 min |
| Example 18 | 2 (114) | CMK-3(150) (40) | 0 | 0 | 80° C./30 min |
| Example 19 | 2 (76) | CMK-3(150) (60) | 0 | 0 | 80° C./30 min |
| Example 20 | 2 (38) | CMK-3(150) (80) | 0 | 0 | 80° C./30 min |
| Example 21 | 2 (188) | CMK-3(150) (1) | 0 | 0 | 90° C./20 min |
| Example 22 | 2 (188) | CMK-3(150) (1) | THF(10) | 0 | 90° C./20 min |
| Example 23 | 2 (188) | CMK-3(150) (1) | CHCl3(10) | 0 | 100° C./10 min |
| Example 24 | 2 (184) | CMK-3(100) (3) | CHCl3(10) | AlACA | 80° C./30 min |
| Example 25 | 2 (184) | CMK-3(100) (3) | iPA(10) | PEG 200 | 80° C./30 min |
| Example 26 | 2 (184) | CMK-3(130) (3) | CHCl3(10) | AlACA | 80° C./30 min |
| Example 27 | 2 (184) | CMK-3(130) (3) | iPA(10) | PEG 200 | 80° C./30 min |
| Example 28 | 2 (184) | CMK-3(150) (3) | CHCl3(10) | AlACA | 80° C./30 min |
| Example 29 | 2 (184) | CMK-3(150) (3) | iPA(10) | PEG 200 | 80° C./30 min |
| Example 30 | 2 (188) | CNC(150) (1) | 0 | 0 | 80° C./30 min |
| Example 31 | 2 (186) | CNC(150) (2) | 0 | 0 | 80° C./30 min |
| Example 32 | 2 (184) | CNC(150) (3) | CHCl3(10) | 0 | 80° C./30 min |
| Example 33 | 2 (182) | CNC(150) (4) | 0 | 0 | 80° C./30 min |
| Example 34 | 2 (180) | CNC(150) (5) | 0 | 0 | 80° C./30 min |
| Example 35 | 2 (184) | CNC(150) (3) | THF(10) | AlACA | 90° C./20 min |
| Example 36 | 2 (184) | CNC(150) (3) | iPA(10) | PEG 200 | 100° C./10 min |
| Example 37 | 2 (180) | PEDOT (5) | 0 | 0 | 60° C./30 min |
| Example 38 | 2 (180) | PEDOT (5) | CHCl3(10) | 0 | 60° C./30 min |
| Example 39 | 2 (180) | PEDOT (5) | THF(10) | 0 | 60° C./30 min |
| Example 40 | 2 (182) | PEDOT (4) | 0 | 0 | 80° C./20 min |
| Example 41 | 2 (182) | PEDOT (4) | CHCl3(10) | 0 | 80° C./20 min |
| Example 42 | 2 (182) | PEDOT (4) | THF(10) | 0 | 80° C./20 min |
| Example 43 | 2 (184) | PEDOT (3) | 0 | 0 | 100° C./10 min |
| Example 44 | 2 (184) | PEDOT (3) | CHCl3(10) | 0 | 100° C./10 min |
| Example 45 | 2 (184) | PEDOT (3) | THF(10) | 0 | 100° C./10 min |
| Example 46 | 2 (184) | PEDOT (3) | CHCl3(10) | AlACA | 80° C./20 min |

TABLE 2-continued

| | Transparent adhesive monomer composition | Electroconductive mesoporous filler[4] | Solvent[5] | Additive[6] | Composition production conditions ° C./min |
|---|---|---|---|---|---|
| Example 47 | 2 (184) | PEDOT (3) | iPA(10) | PEG 200 | 80° C./20 min |
| Example 48 | 2 (188) | PT (1) | 0 | 0 | 80° C./20 min |
| Example 49 | 2 (186) | PT (2) | 0 | 0 | 80° C./20 min |
| Example 50 | 2 (184) | PT (3) | 0 | 0 | 80° C./20 min |
| Example 51 | 2 (182) | PT (4) | CHCl3(10) | 0 | 80° C./20 min |
| Example 52 | 2 (180) | PT (5) | CHCl3(10) | 0 | 80° C./20 min |
| Example 53 | 2 (184) | PT (3) | THF(10) | AlACA | 90° C./20 min |
| Example 54 | 2 (184) | PT (3) | iPA(10) | PEG 200 | 100° C./10 min |
| Example 55 | 2 (188) | P3HT (1) | 0 | 0 | 80° C./20 min |
| Example 56 | 2 (186) | P3HT (2) | 0 | 0 | 80° C./20 min |
| Example 57 | 2 (184) | P3HT (3) | 0 | 0 | 80° C./20 min |
| Example 58 | 2 (182) | P3HT (4) | CHCl3(10) | 0 | 80° C./20 min |
| Example 59 | 2 (180) | P3HT (5) | CHCl3(10) | 0 | 80° C./20 min |
| Example 60 | 2 (184) | P3HT (3) | THF(10) | AlACA | 90° C./20 min |
| Example 61 | 2 (184) | P3HT (3) | iPA(10) | PEG 200 | 100° C./10 min |

[4]Electroconductive filler
CMK-3(100): Mesoporous carbon inversely replicated from mesoporous silica SBA-15(100) (100 means the temperature in Celsius at which silica was aged; average diameter of pores: 8.7 nm, specific surface area: 1260 m$^2$/g, and specific pore volume: 1.1 cm$^3$/g), CMK-3(130): Mesoporous carbon inversely replicated from mesoporous silica SBA-15(130) (130 means the temperature in Celsius at which silica was aged; average diameter of pores: 9.0 nm, specific surface area: 1250 m$^2$/g, and specific pore volume: 1.3 cm$^3$/g), CMK-3(150): Mesoporous carbon inversely replicated from mesoporous silica SBA-15(150) (150 means the temperature in Celsius at which silica was aged; average diameter of pores: 9.3 nm, specific surface area: 1350 m$^2$/g, and specific pore volume: 1.6 cm$^3$/g), CNC(150): Mesoporous carbon inversely replicated from mesoporous silica KIT-6(150) (150 means the temperature in Celsius at which silica was aged; average diameter of pores: 5.2 nm, specific surface area: 1600 m$^2$/g, and specific pore volume: 2.1 cm$^3$/g)
PEDOT: Poly(3,4-ethylenedioxythiophene), produced by mixing 1 g of electroconductive polymer monomer EDOT and 3 g of porous silica KIT-6 with 100 mL of chloroform, subsequently adding 3.3 g of oxidizing agent FeCl$_3$ at 25° C. while being stirred, additionally stirring for 3 hours, filtering the mixture through a filter paper, subsequently washing the filter cake sufficiently with chloroform, hexane, and acetone in this order, and then drying the filter cake for 3 hours in a vacuum at 50° C. (yield: 95%).
PT: Polythiophene, P3HT: Poly(3-hexylthiophene) (molecular weight: 20,000, regioregularity: 99%).
[5]Solvent
THF: Tetrahydrofuran, CHCl$_3$: chloroform, iPA: isopropyl alcohol
[6]Additives
AlACA: Aluminum acetylacetonate, PEG 200: polyethylene glycol (molecular weight 200)

Figure 1:
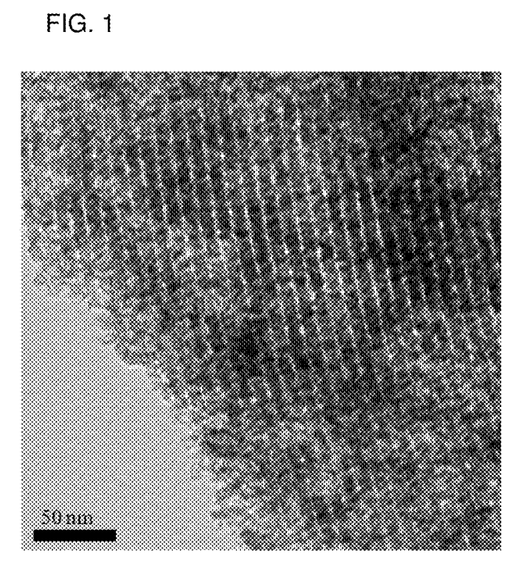
FIG. 1 is an EF-TEM photograph of CMK-3(150) used in the electroconductive mesoporous filler in Examples of the present invention.

An EF-TEM photograph of CMK-3(150) used as an electroconductive mesoporous filler in the Examples is shown in FIG. 1. According to FIG. 1, it can be seen that CMK-3(150) has a carbon nanorod form and has numerous fine pores.

Figure 2:
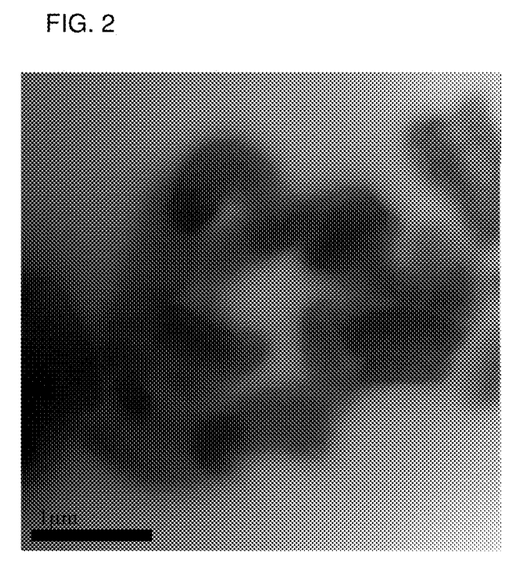
FIG. 2 is an EF-TEM photograph of CMK-3(150) used in the electroconductive mesoporous filler in Example 12 of the present invention.

An EF-TEM photograph of CMK-3(150), which is an electroconductive mesoporous filler, used in the transparent electroconductive adhesive composition in Example 12 is shown in FIG. 2. According to FIG. 2, it can be seen that the particles of CMK-3(150) having a size in the order of micrometers, which serve as an electroconductive mesoporous filler, are connected together at a certain interval and form a channel, and accomplishes the role of an electroconductive adhesive composition.

Figure 3:
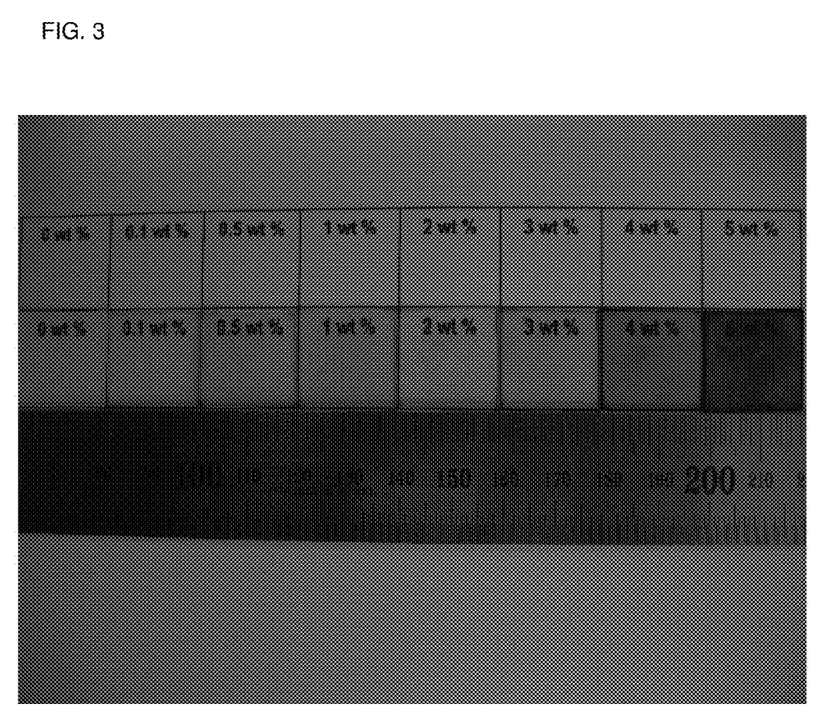
FIG. 3 is a photograph showing the results obtained by measuring the transmittance of the electroconductive transparent adhesive compositions prepared in Examples 9 to 15 of the present invention.

A photograph showing a comparison between 0.5-mm PET films on which the electroconductive transparent adhesive compositions prepared in Comparative Example 1 and Examples 9 to 15 were respectively spin coated to a thickness of 500 nm, and a 0.5-mm PET film that was not coated, is shown in FIG. 3. According to FIG. 3, it can be seen that as the content of the electroconductive mesoporous filler increases, transmittance decreases, and it can be seen that while the content of the electroconductive mesoporous filler was 0.1 parts by weight (Example 9), 0.5 parts by weight (Example 10), 1 part by weight (Example 11), 2 parts by weight (Example 12), 3 parts by weight (Example 13), 4 parts by weight (Example 14), and 5 parts by weight (Example 15), relative to 100 parts by weight of the transparent conductive monomer, as the content of the electroconductive mesoporous filler increased, transmittance decreased.

Preparation Example 3

Preparation of Electroconductive Transparent Adhesive Composition

Synthesis Example 1

Production of Compound Represented by Formula (1-1)

2.5 g (0.0192 mol) of hydroxyethyl methacrylate (HEMA) was dissolved in methylene chloride, and then 1.08 g (0.0192 mol) of KOH was added thereto. The mixture was stirred for 10 minutes. 4.236 g (0.0192 mol) of 4-(4-chlorophenoxyl) phenol was added thereto, and the mixture was stirred. After 24 hours, the mixture was washed several times with distilled water and several times with a 1 wt % aqueous hydrochloric acid solution, the organic layer was separated, and the solvent was eliminated. A residue remaining thereafter was purified by a chromatographic method and using hexane and ethyl acetate at a weight ratio of 1:1. An aqueous solution containing 0.63 g (0.0112 mol) of KOH was added thereto, 1.04 g (0.0112 mol) of epichlorohydrin was added thereto, and the mixture was stirred at normal temperature. After 24 hours, chloroform was added to the mixture to extract the product, and then the extract was washed several times with distilled water. Subsequently, epichlorohydrin and the solvent were evaporated at 70° C. A residue remaining thereafter was purified by a chromatographic method and using hexane and ethyl acetate at a weight ratio of 1:1, so as to separate a compound represented by the Formula (1-1), and the compound was purified to a purity of 99% or higher (yield: 72%).

$^1$H NMR (300 MHz, CDCl$_3$); δ 2.01 ppm, 2.38/2.63/3.04 ppm, 3.95-4.52 ppm, 6.40-6.95 ppm, 7.32 ppm Mass: 370.40

Synthesis Example 2

Production of Compound Represented by Chemical Formula (1-2)

2.5 g (0.0192 mol) of hydroxyethyl methacrylate (HEMA) was dissolved in methylene chloride, and then 1.08 g (0.0192 mol) of KOH was added thereto. The mixture was stirred for 10 minutes. 4.218 g (0.0192 mol) of 4-(4-chlorophenoxy) aniline was added thereto, and the mixture was stirred. After 24 hours, the mixture was washed several times with distilled water and several times with a 1 wt % aqueous hydrochloric acid solution, the organic layer was separated, and the solvent was eliminated. A residue remaining thereafter was purified by a chromatographic method and using hexane and ethyl acetate at a weight ratio of 1:1. An aqueous solution containing 0.89 g (0.0112 mol) of pyridine was added thereto, 1.04 g (0.0112 mol) of epichlorohydrin was added thereto, and the mixture was stirred at normal temperature. After 24 hours, chloroform was added to the mixture to extract the product, and then the extract was washed several times with distilled water. Subsequently, epichlorohydrin and the solvent were evaporated at 70° C. A residue remaining thereafter was purified by a chromatographic method and using hexane and ethyl acetate at a weight ratio of 1:1, so as to separate a compound represented by the Chemical Formula (1-2), and the compound was purified to a purity of 99% or higher (yield: 65%).

$^1$H NMR (300 MHz, CDCl$_3$); δ 2.01 ppm, 2.38/2.63/2.77 ppm, 3.36/3.61 ppm, 4.42/4.52 ppm, 6.40-6.95 ppm, 7.32 ppm Mass: 425.47

Synthesis Example 3

Production of Compound Represented by Chemical Formula (1-3)

5.46 g (0.027 mol) of dihydroxydiphenyl ether was dissolved in methylene chloride, and then 2.73 g (0.027 mol) of triethylamine (TEA) was added thereto. The mixture was stirred for 10 minutes. 2.82 g (0.027 mol) of methacryloyl chloride was added thereto, and the mixture was stirred. After 24 hours, the mixture was washed several times with distilled water and several times with a 1 wt % aqueous hydrochloric acid solution, the organic layer was separated, and the solvent was eliminated. A residue remaining thereafter was purified by a chromatographic method and using chloroform. An aqueous solution containing 0.89 g (0.0158 mol) of KOH was added thereto, 1.462 g (0.0158 mol) of epichlorohydrin was added thereto, and the mixture was stirred at normal temperature. After 24 hours, chloroform was added to the mixture to extract the product, and then the extract was washed several times with distilled water. Subsequently, epichlorohydrin and the solvent were evaporated at 70° C. A residue remaining thereafter was purified by a chromatographic method and using hexane and ethyl acetate at a weight ratio of 2:1, so as to separate a compound represented by the Chemical Formula (1-3), and the compound was purified to a purity of 99% or higher (yield: 78%).

$^1$H NMR (300 MHz, CDCl$_3$); δ 2.01 ppm, 2.38/2.63/3.04 ppm, 3.95/4.20 ppm, 6.95/7.32 ppm, 7.25/7.40 ppm Mass: 326.34

Synthesis Example 4

Production of Compound Represented by Chemical Formula (1-4)

5.46 g (0.027 mol) of dihydroxydiphenyl ether was dissolved in methylene chloride, and then 2.73 g (0.027 mol) of triethylamine (TEA) was added thereto. The mixture was stirred for 10 minutes. 2.44 g (0.027 mol) of acyloyl chloride was added thereto, and the mixture was stirred. After 24 hours, the mixture was washed several times with distilled water and several times with a 1 wt % aqueous hydrochloric acid solution, the organic layer was separated, and the solvent was eliminated. A residue remaining thereafter was purified by a chromatographic method and using chloroform. An aqueous solution containing 0.89 g (0.0158 mol) of KOH was added thereto, 1.462 g (0.0158 mol) of epichlorohydrin was added thereto, and the mixture was stirred at normal temperature. After 24 hours, chloroform was added to the mixture to extract the product, and then the extract was washed several times with distilled water. Subsequently, epichlorohydrin and the solvent were evaporated at 70° C. A residue remaining thereafter was purified by a chromatographic method and using hexane and ethyl acetate at a weight ratio of 2:1, so as to separate a compound represented by the Chemical Formula (1-4), and the compound was purified to a purity of 99% or higher (yield: 76%).

$^1$H NMR (300 MHz, CDCl$_3$); δ 2.38/2.63/3.04 ppm, 3.95/4.20 ppm, 5.50/6.03/6.10 ppm, 6.95/7.32 ppm, 7.25/7.40 ppm Mass: 312.32

Synthesis Example 5

Production of Compound Represented by Chemical Formula (1-5)

5.38 g (0.0225 mol) of oxybischlorobenzene was dissolved in DMF, and then an aqueous solution of 1.26 g (0.0225 mol) of NaSH was added thereto. The mixture was stirred for 24 hours. The mixture was washed with water several times and filtered, and thus oxydibenzenethiol was obtained. The oxydibenzenethiol thus obtained was dissolved in methylene chloride, and then 1.50 g (0.0148 mol) of triethylamine (TEA) was added thereto. The mixture was stirred for 10 minutes. 1.54 g (0.0148 mol) of methacryloyl chloride was added thereto, and the mixture was stirred. After 24 hours, the mixture was washed several times with distilled water and several times with a 1 wt % aqueous hydrochloric acid solution, the organic layer was separated, and the solvent was eliminated. A residue remaining thereafter was purified by a chromatographic method and using chloroform. An aqueous solution containing 0.89 g (0.0158 mol) of KOH was added thereto, 1.462 g (0.0158 mol) of epichlorohydrin was added thereto, and the mixture was stirred at normal temperature. After 36 hours, chloroform was added to the mixture to extract the product, and then the extract was washed several times with distilled water. Subsequently, epichlorohydrin and the solvent were evaporated. A residue remaining thereafter was purified by a chromatographic method and using hexane and ethyl acetate at a weight ratio of 2:1, so as to separate a compound represented by the Chemical Formula (1-5), and the compound was purified to a purity of 99% or higher (yield: 75%).

¹H NMR (300 MHz, CDCl₃); δ 2.38-3.02 ppm, 5.98/6.04 ppm, 7.21/7.58 ppm, 7.27/7.35 ppm
Mass: 358.47

Synthesis Example 6

Production of Compound Represented by Chemical Formula (1-6)

5.38 g (0.0225 mol) of oxybischlorobenzene was dissolved in DMF, and then an aqueous solution of 1.26 g (0.0225 mol) of NaSH was added thereto. The mixture was stirred for 24 hours. The mixture was washed with water several times and filtered, and thus oxydibenzenethiol was obtained. The oxydibenzenethiol thus obtained was dissolved in methylene chloride, and then 1.50 g (0.0148 mol) of triethylamine (TEA) was added thereto. The mixture was stirred for 10 minutes. 1.34 g (0.0148 mol) of acyloyl chloride was added thereto, and the mixture was stirred. After 24 hours, the mixture was washed several times with distilled water and several times with a 1 wt % aqueous hydrochloric acid solution, the organic layer was separated, and the solvent was eliminated. A residue remaining thereafter was purified by a chromatographic method and using chloroform. An aqueous solution containing 0.89 g (0.0158 mol) of KOH was added thereto, 1.462 g (0.0158 mol) of epichlorohydrin was added thereto, and the mixture was stirred at normal temperature. After 36 hours, chloroform was added to the mixture to extract the product, and then the extract was washed several times with distilled water. Subsequently, epichlorohydrin and the solvent were evaporated. A residue remaining thereafter was purified by a chromatographic method and using hexane and ethyl acetate at a weight ratio of 2:1, so as to separate a compound represented by the Chemical Formula (1-6), and the compound was purified to a purity of 99% or higher (yield: 75%).

¹H NMR (300 MHz, CDCl₃); δ 2.38-3.02 ppm, 5.78/6.00/6.31 ppm, 7.27/7.35 ppm, 7.21/7.58 ppm
Mass: 344.45

Synthesis Example 7

Production of Compound Represented by Chemical Formula (1-7)

6.72 g (0.02 mol) of 4,4'-(perfluoropropane-2,2'-diyl)diphenol was dissolved in DMF, and then an aqueous solution of 2.24 g (0.04 mol) of NaSH was added thereto. The mixture was stirred for 24 hours. The mixture was washed with a 1 wt % aqueous hydrochloric acid solution several times and filtered, and thus dithiol was obtained. The dithiol thus obtained was dissolved in methylene chloride, and then 1.79 g (0.0177 mol) of triethylamine (TEA) was added thereto. The mixture was stirred for 10 minutes. Subsequently, 1.85 g (0.0177 mol) of methacryloyl chloride was added thereto, and the mixture was stirred. After 40 hours, the mixture was washed several times with distilled water and several times with a 1 wt % aqueous hydrochloric acid solution, the organic layer was separated, and the solvent was eliminated. A residue remaining thereafter was purified by a chromatographic method and using hexane and ethyl acetate at a weight ratio of 2:1. An aqueous solution containing 0.6 g of NaOH was added thereto, 0.1 g of benzyltripropylammonium chloride and 1.27 g (0.0137 mol) of epichlorohydrin were added thereto, and the mixture was stirred at normal temperature. After 48 hours, chloroform was added to the mixture to extract the product, and then the extract was washed several times with distilled water. Subsequently, epichlorohydrin and the solvent were evaporated at 70° C., and then a compound represented by the Chemical Formula (1-7) was separated by a chromatographic method and using hexane and ethyl acetate at a weight ratio of 2:1 (polymerization efficiency: 80%).

¹H NMR (300 MHz, CDCl₃); δ 2.38/2.63 ppm, 2.43 ppm, 2.77/3.02 ppm, 2.81 ppm, 5.98 ppm, 6.04 ppm, 6.93-7.31 ppm
Mass: 492.50

Synthesis Example 8

Production of Compound Represented by Chemical Formula (1-8)

4.91 g (0.0225 mol) of 4,4'-thiodiphenol was dissolved in DMF, and then an aqueous solution of 1.26 g (0.0225 mol) of NaSH was added thereto. The mixture was stirred for 24 hours. The mixture was washed with water several times and filtered, and thus oxydibenzenethiol was obtained. The oxydibenzenethiol thus obtained was dissolved in methylene chloride, and then 1.50 g (0.0148 mol) of triethylamine (TEA) was added thereto. The mixture was stirred for 10 minutes. Subsequently, 1.34 g (0.0148 mol) of acyloyl chloride was added thereto, and the mixture was stirred. After 24 hours, the mixture was washed several times with distilled water and several times with a 1 wt % aqueous hydrochloric acid solution, the organic layer was separated, and the solvent was eliminated. A residue remaining thereafter was purified by a chromatographic method and using hexane and ethyl acetate. An aqueous solution containing 0.89 g (0.0158 mol) of KOH was added thereto, 1.462 g (0.0158 mol) of epichlorohydrin was added thereto, and the mixture was stirred at normal temperature. After 36 hours, chloroform was added to the mixture to extract the product, and then the extract was washed several times with distilled water. Epichlorohydrin and the solvent were evaporated, and then a compound represented by the Formula (1-8) was separated by a chromatographic method and using hexane and ethyl acetate at a weight ratio of 2:1. The compound was purified to a purity of 99% or higher (yield: 75%).

¹H NMR (300 MHz, CDCl₃); δ 2.38-3.02 ppm, 5.78/6.00/6.31 ppm, 7.19-7.31 ppm
Mass: 360.51

Synthesis Example 9

Production of Compound Represented by Chemical Formula (1-9)

5.63 g (0.0225 mol) of 4,4'-sulfonyldiphenol was dissolved in DMF, and then an aqueous solution of 1.26 g (0.0225 mol) of NaSH was added thereto. The mixture was stirred for 24 hours. The mixture was washed with a 1 wt % aqueous hydrochloric acid solution several times and filtered, and thus monothiol was obtained. The monothiol thus obtained was dissolved in methylene chloride, and then 1.5 g (0.0148 mol) of triethylamine (TEA) was added thereto. The mixture was stirred for 10 minutes. Subsequently, 1.55 g (0.0148 mol) of methacryloyl chloride was added thereto, and the mixture was stirred. After 24 hours, the mixture was washed several times with distilled water and several times with a 1 wt % aqueous hydrochloric acid solution, the organic layer was separated, and the solvent was eliminated. A residue remaining thereafter was purified by a chromatographic method and using hexane and ethyl acetate. An aqueous solution containing 0.89 g (0.0158 mol) of KOH was added thereto, 1.462 g (0.0158 mol) of epichlorohydrin was added thereto, and the mixture was stirred at normal temperature. After 36 hours, chloroform was added to the mixture to extract the product, and then the extract was washed several times with distilled water. Epichlorohydrin and the solvent were evaporated, and then a compound represented by the Chemical Formula (1-9) was separated by a chromatographic method and using hexane and ethyl acetate at a weight ratio of 2:1. The compound was purified to a purity of 99% or higher (yield: 79%).

$^1$H NMR (300 MHz, CDCl$_3$); δ 2.38-3.02 ppm, 5.50/6.03/ 6.10 ppm, 7.46-8.15 ppm Mass: 376.45

Electroconductive transparent adhesive compositions were prepared using the electroconductive transparent composition 2 of Table 1, by varying the constituent components, composition ratios, production conditions and the like as indicated in the following Table 3. However, the production conditions for the transparent adhesive monomer composition 2 shown in the Table 1 can be carried out before the transparent adhesive monomer composition 2 and the constituent components of the following Table 3 are mixed.

TABLE 3

| Example | Constituent component (weight, g) | | | | | Composition production conditions ° C./min |
|---|---|---|---|---|---|---|
| | Transparent adhesive monomer composition | Electroconductive mesoporous filler[4] | Monomer of Formula (1) | Solvent[5] | Additive[6] | |
| 62 | 2(165) | CMK-3(100)(3) | Formula 1-1(10) | CHCl$_3$(20) | AIACA | 80° C./20 min |
| 63 | 2(167) | CMK-3(100)(2) | Formula 1-2(10) | iPA(20) | AIACA | 90° C./20 min |
| 64 | 2(169) | CMK-3(100)(1) | Formula 1-3(10) | iPA(20) | AIACA | 100° C./10 min |
| 65 | 2(167) | CMK-3(130)(2) | Formula 1-4(10) | — | PEG 200 | 90° C./20 min |
| 66 | 2(165) | CMK-3(130)(3) | Formula 1-5(10) | THF(20) | AIACA | 90° C.120 min |
| 67 | 2(169) | CMK-3(130)(1) | Formula 1-6(10) | — | PEG 200 | 80° C./20 min |
| 68 | 2(169) | CMK-3(150)(1) | Formula 1-7(10) | CHCl$_3$(20) | AIACA | 90° C./15 min |
| 69 | 2(167) | CMK-3(150)(2) | Formula 1-8(10) | CHCl$_3$(20) | AIACA | 90° C./15 min |
| 70 | 2(165) | CMK-3(150)(3) | Formula 1-9(10) | CHCl$_3$(20) | AIACA | 90° C./15 min |
| 71 | 2(170) | PEDOT(0.5) | Formula 1-1(10) | CHCl$_3$(20) | AIACA | 80° C./20 min |
| 72 | 2(169) | PEDOT(1) | Formula 1-2(10) | iPA(20) | AIACA | 90° C./20 min |
| 73 | 2(168) | PEDOT(1.5) | Formula 1-3(10) | iPA(20) | AIACA | 100° C./10 min |
| 74 | 2(167) | PEDOT(2) | Formula 1-4(10) | — | PEG 200 | 90° C./20 min |
| 75 | 2(166) | PEDOT(2.5) | Formula 1-5(10) | THF(20) | AIACA | 90° C./20 min |
| 76 | 2(165) | PEDOT(3) | Formula 1-6(10) | — | PEG 200 | 80° C./20 min |
| 77 | 2(164) | PEDOT(3.5) | Formula 1-7(10) | CHCl$_3$(20) | AIACA | 90° C./15 min |
| 78 | 2(163) | PEDOT(4) | Formula 1-8(10) | CHCl$_3$(20) | AIACA | 90° C./15 min |
| 79 | 2(162) | PEDOT(4.5) | Formula 1-9(10) | CHCl$_3$(20) | AIACA | 90° C./15 min |

Preparation Example 4

Production of Electroconductive Transparent Adhesive

Comparative Example 2

The electroconductive transparent adhesive composition prepared in Comparative Example 1 was applied respectively on two sheets of ITO films, and then the ITO films were placed on a hot plate at 90° C. for 20 minutes to achieve polymerization. Subsequently, the two sheets of ITO films coated with the electroconductive transparent adhesive composition were bonded under a load of 500 g, and thus a transparent adhesive film was produced. The adhesive strength at this time was 652 N.

Comparative Example 3

The operation was carried out in the same manner as in Comparative Example 2, except that an adhesive composition manufactured by 3M Corp. was used, and thus a transparent adhesive film was produced.

Examples 80 to 108

Transparent adhesive films were produced in the same manner as in Comparative Example 2, except that the electroconductive transparent adhesive compositions prepared in the Examples described above were used as indicated in the following Table 4. The thickness, transmittance and tensile strength of the transparent adhesive films produced in Comparative Examples 2 and 3, and Examples 80 to 108 were measured, and the results are presented in the following Table 4.

TABLE 4

|  | Composition | Thickness (μm) | Transmittance (%) | Tensile strength (N) | Electrical conductivity (S/cm) |
| --- | --- | --- | --- | --- | --- |
| Comparative Example 2 | 2 | 10 | 99 | 688 | $\sim 10^{-12}$ |
| Comparative Example 3 | 3M conductive adhesive | 50 | 0 | 369 | $\sim 10^{-5}$ |
| Example 80 | 21 | 2 | 70 | 1033 | $9.6 \times 10^{-5}$ |
| Example 83 | 25 | 2 | 73 | 1095 | $1.4 \times 10^{-4}$ |
| Example 84 | 29 | 2 | 99 | 692 | $3.0 \times 10^{-10}$ |
| Example 85 | 30 | 2 | 95 | 1130 | $5.0 \times 10^{-10}$ |
| Example 86 | 31 | 2 | 91 | 1778 | $4.6 \times 10^{-8}$ |
| Example 87 | 32 | 2 | 83 | 1850 | $1.5 \times 10^{-5}$ |
| Example 88 | 33 | 2 | 76 | 2238 | $2.2 \times 10^{-4}$ |
| Example 89 | 34 | 2 | 20 | 4520 | $6.4 \times 10^{-4}$ |
| Example 90 | 35 | 2 | 0 | 23 | $1.7 \times 10^{-3}$ |
| Example 91 | 36 | 2 | 0 | 6 | $9.5 \times 10^{-3}$ |
| Example 92 | 37 | 2 | 0 | 1 | $2.2 \times 10^{-2}$ |
| Example 93 | 42 | 2 | 90 | 1628 | $3.7 \times 10^{-8}$ |
| Example 94 | 43 | 2 | 90 | 1602 | $2.6 \times 10^{-8}$ |
| Example 95 | 48 | 2 | 76 | 2482 | $9.8 \times 10^{-5}$ |
| Example 96 | 49 | 2 | 78 | 2143 | $7.2 \times 10^{-5}$ |
| Example 97 | 52 | 2 | 74 | 2187 | $4.2 \times 10^{-4}$ |
| Example 98 | 55 | 2 | 74 | 2319 | $1.9 \times 10^{-4}$ |
| Example 99 | 56 | 2 | 76 | 2047 | $8.5 \times 10^{-5}$ |
| Example 100 | 57 | 2 | 82 | 525 | $6.5 \times 10^{-5}$ |
| Example 101 | 60 | 2 | 84 | 545 | $3.4 \times 10^{-5}$ |
| Example 102 | 63 | 2 | 87 | 560 | $8.8 \times 10^{-6}$ |
| Example 103 | 66 | 2 | 87 | 682 | $6.7 \times 10^{-6}$ |
| Example 104 | 67 | 2 | 88 | 433 | $4.8 \times 10^{-6}$ |
| Example 105 | 70 | 2 | 76 | 2221 | $1.1 \times 10^{-4}$ |
| Example 106 | 73 | 2 | 75 | 2145 | $9.7 \times 10^{-5}$ |
| Example 107 | 74 | 2 | 76 | 2139 | $9.2 \times 10^{-5}$ |
| Example 108 | 77 | 2 | 81 | 2448 | $4.6 \times 10^{-6}$ |
| Example 109 | 78 | 2 | 80 | 2419 | $2.6 \times 10^{-6}$ |
| Example 110 | 79 | 2 | 80 | 2387 | $2.1 \times 10^{-6}$ |

According to the results in Table 4, it can be seen that the transparent adhesive film produced in the Examples have superior electrical conductivity, as well as excellent transmittance and tensile strength as compared with the adhesive film of Comparative Example 3. On the other hand, it can be seen that in Comparative Example 2, since an electroconductive filler was not added, the adhesive film did not have electrical conductivity.

The invention claimed is:

1. An electroconductive transparent adhesive composition comprising:
   a transparent adhesive monomer;
   any one electroconductive mesoporous filler selected from the group consisting of porous carbon, an electroconductive polymer and combinations thereof;
   a compound represented by the following Chemical Formula (1):

[Chemical Formula 1]

wherein in the Formula (1),

$R_1$ represents any one selected from the group consisting of a hydrogen atom and an alkyl group;

$R_2$ and $R_4$ each independently represent an alkanediyl group;

$R_3$ represents any one selected from the group consisting of compounds represented by the following Formulae (2-1) to (2-4):

[Chemical Formula 2-1]

$(CR_{11}R_{12})n_{11}(CH_2)n_{12}$

[Chemical Formula 2-2]

[Chemical Formula 2-3]

-continued

[Chemical Formula 2-4]

wherein, in the Formulae (2-1) to (2-4), $R_{11}$, $R_{12}$, $R_{21}$, $R_{32}$, $R_{33}$, $R_{41}$, $R_{42}$ and $R_{43}$ represents any one selected from the group consisting of a hydrogen atom and an alkyl group; $R_{31}$ represents any one selected from the group consisting of an alkanediyl group, S, O, CO, $C(CH_3)_2$, $C(CF_3)_2$, $SO_2$, and combinations thereof; $X_{41}$ to $X_{43}$ each independently represent any one selected from the group consisting of N and CH; $n_{11}$ and $n_{12}$ each independently represent an integer from 1 to 30; $n_{21}$, $n_{32}$ and $n_{33}$ each independently represent an integer from 0 to 4; $n_{31}$ represent an integer from 0 to 1; and $n_{41}$ to $n_{43}$ each independently represent an integer from 0 to 5;

X and Z each independently represent any one selected from the group consisting of N, O, S, CO, and combinations thereof;

Y represents any one selected from the group consisting of O, S, CO, and combinations thereof;

L and O each independently represent an integer from 0 to 30;

M and N each independently represent an integer from 1 to 5; and

P and Q each independently represent an integer of 1 or 2 and a polymerization initiator.

2. The electroconductive transparent adhesive composition according to claim 1, wherein the porous carbon has an average diameter of pores of 0.5 nm to 1 μm, a specific surface area of 0.01 m²/g or larger, and a specific pore volume of 0.01 cm³/g or larger.

3. The electroconductive transparent adhesive composition according to claim 1, wherein the electroconductive polymer is any one selected from the group consisting of polyacetylene, polypyrrole, polythiophene, poly(3-alkylthiophene), polyphenylene sulfide, poly-para-phenylene sulfide, polyphenylenevinylene, poly-para-phenylenevinylene, poly-thienylenevinylene, polyphenylene, poly-para-phenylene, polyazulene, polyfuran, polyaniline, polyselenophene, polytellurophene, derivatives thereof, and combinations thereof.

4. The electroconductive transparent adhesive composition according to claim 1, wherein the transparent adhesive monomer is any one selected from the group consisting of acrylic monomers, epoxy-based monomers, ether-based monomers, and combinations thereof.

5. The electroconductive transparent adhesive composition according to claim 1, wherein the electroconductive transparent adhesive composition comprises:
0.001 parts to 100 parts by weight of the electroconductive mesoporous filler,
0.001 parts to 100 parts by weight of an initiator, and
0 parts to 1000 parts by weight of an organic solvent,
relative to 100 parts by weight of the transparent adhesive monomer.

6. The electroconductive transparent adhesive composition according to claim 1, wherein the electroconductive transparent adhesive composition comprises 0.001 parts to 100,000 parts by weight of the compound represented by Formula (1) relative to 100 parts by weight of the transparent adhesive monomer.

7. The electroconductive transparent adhesive comprising a composite of the transparent adhesive monomer and the electroconductive mesoporous filler produced by polymerizing the electroconductive transparent adhesive composition according to claim 1.

8. The electroconductive transparent adhesive comprising a composite of the transparent adhesive monomer and the electroconductive mesoporous filler produced by polymerizing the electroconductive transparent adhesive composition according to claim 2.

9. The electroconductive transparent adhesive comprising a composite of the transparent adhesive monomer and the electroconductive mesoporous filler produced by polymerizing the electroconductive transparent adhesive composition according to claim 3.

10. The electroconductive transparent adhesive comprising a composite of the transparent adhesive monomer and the electroconductive mesoporous filler produced by polymerizing the electroconductive transparent adhesive composition according to claim 4.

11. The electroconductive transparent adhesive comprising a composite of the transparent adhesive monomer and the electroconductive mesoporous filler produced by polymerizing the electroconductive transparent adhesive composition according to claim 5.

12. The electroconductive transparent adhesive comprising a composite of the transparent adhesive monomer and the electroconductive mesoporous filler produced by polymerizing the electroconductive transparent adhesive composition according to claim 6.

* * * * *